United States Patent [19]

Rivest et al.

[11] 4,405,829
[45] Sep. 20, 1983

[54] CRYPTOGRAPHIC COMMUNICATIONS SYSTEM AND METHOD

[75] Inventors: Ronald L. Rivest, Belmont; Adi Shamir, Cambridge; Leonard M. Adleman, Arlington, all of Mass.

[73] Assignee: Massachusetts Institute of Technology, Cambridge, Mass.

[21] Appl. No.: 860,586

[22] Filed: Dec. 14, 1977

[51] Int. Cl.³ .......................... H04K 1/00; H04I 9/04
[52] U.S. Cl. .................................. 178/22.1; 178/22.11
[58] Field of Search ..................... 178/22, 22.1, 22.11, 178/22.14, 22.15

[56] References Cited

U.S. PATENT DOCUMENTS 3,657,476  4/1972  Aiken .................................. 178/22

OTHER PUBLICATIONS

"New Directions in Cryptography", Diffie et al., *IEEE Transactions on Information Theory,* vol. IT-22, No. 6, Nov. 1976, pp. 644–654.
"Theory of Numbers" Stewart, MacMillan Co., 1952, pp. 133–135.
"Diffie et al., Multi-User Cryptographic Techniques", AFIPS. Conference Proceedings, vol. 45, pp. 109–112, Jun. 8, 1976.

*Primary Examiner*—Sal Cangialosi
*Attorney, Agent, or Firm*—Arthur A. Smith, Jr.; Robert J. Horn, Jr.

[57] ABSTRACT

A cryptographic communications system and method. The system includes a communications channel coupled to at least one terminal having an encoding device and to at least one terminal having a decoding device. A message-to-be-transferred is enciphered to ciphertext at the encoding terminal by first encoding the message as a number M in a predetermined set, and then raising that number to a first predetermined power (associated with the intended receiver) and finally computing the remainder, or residue, C, when the exponentiated number is divided by the product of two predetermined prime numbers (associated with the intended receiver). The residue C is the ciphertext. The ciphertext is deciphered to the original message at the decoding terminal in a similar manner by raising the ciphertext to a second predetermined power (associated with the intended receiver), and then computing the residue, M', when the exponentiated ciphertext is divided by the product of the two predetermined prime numbers associated with the intended receiver. The residue M' corresponds to the original encoded message M.

40 Claims, 7 Drawing Figures

CRYPTOGRAPHIC COMMUNICATIONS SYSTEM AND METHOD

The Government has rights in this invention pursuant to Contract No. N00014-67-A-0204, awarded by the Department of the Navy, and Grant No. MCS76-14249, awarded by the National Science Foundation.

BACKGROUND OF THE DISCLOSURE

This invention relates to communications, and more particularly to cryptographic communications systems and methods.

With the development of computer technology, the transfer of information in digital form has rapidly increased. There are many applications, including electronic mail systems, bank systems and data processing systems, where the transferred information must pass over communications channels which may be monitored by electronic eavesdroppers. While the degree of security required may vary for various applications, it is generally important for all of these examples that the substance of particular communications pass directly from a sender to an intended receiver without intermediate parties being able to interpret the transferred message. In addition, there are further instances where information in computer memory banks must be protected from snoopers who have access to the memory through data processing networks.

In addition to these privacy requirements, authentication of the source of a message must often be insured along with the verification and security of the message content. For example, in banking applications, it is required that a signed document, such as a bank draft, be authenticated as being actually signed by the indicated signator. Furthermore, in many applications, it is desirable to further require safeguards against signature forgery by a message recipient.

In the prior art, a number of cryptographic encoding and decoding techniques are readily available to provide some degree of privacy and authentication for digital communications, for example, the data encryption standards adopted by the National Bureau of Standards, see *Federal Register*, Mar. 17, 1975, Volume 40, No. 52 and Aug. 1, 1975, Volume 40, No. 149.

In general, cryptographic systems are adapted to transfer a message between remote locations. Such systems include at least one encoding device at a first location and at least one decoding device at a second location, with the encoding and decoding devices all being coupled to a communication channel. For digital systems, the message is defined to be a digital message, M, that is, a sequence of symbols from some alphabet. In practice, the alphabet is generally chosen to be the binary alphabet consisting of the symbols 0 and 1.

Each encoding device is an apparatus which accepts two inputs: a message-to-be-encoded, M, and an encoding key or operator, E. Each encoding device transforms the message M in accordance with the encryption operator to produce an encoded version C of the message (which is denoted as the ciphertext) where $C = E(M)$. The encoding key and the ciphertext are also digital sequences.

Each decoding device is an apparatus which accepts two inputs: a ciphertext-to-be-decoded C and a decoding key or operator, D. Each decoding device transforms the ciphertext in accordance with the decryption operator to produce a decoded version M' of the ciphertext where $M' = D(C)$, or $M' = D(E(M))$. Like the encoding key, the decoding key and decoded message M' are also digital sequences. The encoding and decoding keys are selected so that $M' = M$ for all messages M.

In operation, a message, once encoded into ciphertext, is transmitted over the channel to a recipient who decodes the received ciphertext to obtain the original message M. Thus, a recipient sees the original message M as the output of his decoding device.

To a large degree, the quality of performance of a cryptographic system depends on the complexity of the encoding and decoding devices. Regarding the problem of ensuring privacy of communications for a system where an eavesdropper can listen to every message transmitted on the communications channel (which might, for example, be a radio link), the effectiveness of the system depends upon the ability to ensure that the eavesdropper is unable to understand any such overheard messages. In the prior art systems, the sender and recipient arrange to have corresponding encoding and decoding keys which are kept secret from the eavesdropper, so that even if the eavesdropper knows the construction of the encoding and decoding devices, he would not be able to decode the messages he hears, even after hearing a large number of messages. In practice, however, this constraint results in extremely complex and correspodingly expensive equipment. A disadvantage of the prior art systems results from the general requirement that the pre-arranged encoding and decoding keys must be delivered in a secure fashion (often by courier) to the sender and receiver, respectively, to enable communication through the systems.

The "public-key cryptosystem" described by Diffie and Hellman, "New Directions In Cryptography", IEEE Transactions on Information Theory (Nov. 1976), in principle, provides enciphered communication between arbitrary pairs of people, without the necessity of their agreeing on an enciphering key beforehand. The Diffie and Hellman system also provides a way of creating for a digitized document a recognizable, unforgeable, document-dependent, digitized signature whose authenticity the signer cannot later deny.

In a public-key cryptosystem, each user (e.g. user A) places in a public file an enciphering operator, or key, $E_A$. User A keeps to himself the details of the corresponding deciphering key $D_A$ which satisfies the equation $$D_A(E_A(M)) = M,$$

for any message M. In order for the public key system to be practical, both $E_A$ and $D_A$ must be efficiently computable. Furthermore, user A must not compromise $D_A$ when revealing $E_A$. That is, it should not be computationally feasible for an eavesdropper to find an efficient way of computing $D_A$, given only a specification of the enciphering key $E_A$ (even though a very inefficient way exists: to compute $D_A(C)$, just enumerate all possible messages M until one such that $E_A(M) = C$ is found. Then $D_A(C) = M$.). In a public key system, a judicious selection of keys ensures that only user A is able to compute $D_A$ efficiently.

Whenever another user (e.g. user B) wishes to send a message M to A, he looks up $E_A$ in the public file and then sends the enciphered message $E_A(M)$ to user A. User A deciphers the message by computing $D_A(E_A(M)) = M$. Since $D_A$ is not derivable from $E_A$ in a practical way, only user A can decipher the message $E_A(M)$ sent to him. If user A wants to send a response to user B, user A enciphers the message using user B's encryption key $E_B$, also available in the public file. Therefore no transactions between users A and B, such as exchange of secret keys, are required to initiate private communication. The only "setup" required is that each user who wishes to receive private communication must place his enciphering key E in the public file.

The public key approach of Diffie and Hellman is also useful in principle to provide signed digital messages that are both message-dependent and signer-dependent. The recipient of a "signed" message not only knows the message substance, but also can provide that the message originated from the identified sender. A signed message precludes the possibility that a recipient could modify the received message by changing a few characters or that the recipient could attach the received signature to any message whatsoever. This is a particular problem for digital messages inasmuch as electronic "cutting and pasting" of sequences of characters are generally undetectable in the final product.

In order to implement signatures on messages transferred between two users, e.g. user A and user B, in accordance with the Diffie and Hellman system, each user has encoding keys $E_A$ and $E_B$, respectively, on a public file and decoding keys $D_A$ and $D_B$, respectively, privately held. Each user's encoding and decoding keys must effect permutations of the same message space S, so that the following relation s hold:

$$D_A(E_A(M)) = M$$

$$E_A(D_A(M)) = M$$

$$D_B(E_B(M)) = M$$

$$E_B(D_B(M)) = M$$

for any message M.

When user A wants to send user B a "signed" document M, user A first uses his own decryption key $D_A$ to transform M into a signed message word $M_s = D_A(M)$. User A then uses user B's encryption key $E_B$ (from the public file) to generate a signed ciphertext word $C_s = E_B(M_s) = E_B(D_A(M))$, which is sent to user B. User B initially uses his secret decryption key $D_B$ to reduce the signed ciphertext $C_s$ to a signed message word in accordance with $D_B(C_s) = D_B(E_B(M_s)) = M_s$. Now using user A's encoding key $E_A$ (available from the public file), user B decodes the signed message word in accordance with $E_A(M_s) = E_A = M$.

User A cannot deny having sent user B this message, since no one but A could have created $M_s = D_A(M)$, provided that $D_A$ is not computable from $E_A$. Furthermore, user B can show that the public key $E_A$ is necessary to extract the message M so that user B has "proof" that user A has signed the document. User B cannot modify M to a different version M', since then user B would have to create the corresponding signature $D_A(M')$ as well. Therefore user B must have received a document "signed" by A, which he can "prove" that A sent, but which B cannot modify in any detail.

While the public-key cryptosystem principles as described above, and their potential use as a means of implementing digital "signatures", are known in the prior art, there are no practical implementations which are known, either with or without signature.

Accordingly, it is an object of this invention to provide a system and method for implementing a private communications system.

It is another object to provide a system and method for establishing a private communications system for transmission of signed messages.

It is still another object to provide a system and method for implementing a public key cryptographic communications system.

It is a further object to provide a system and method for encoding and decoding digital data.

SUMMARY OF THE INVENTION

Briefly, the present invention includes at least one encoding device, at least one decoding device, and a communication channel, where the encoding and decoding devices are coupled to the channel. The encoding device is responsive to an applied message-to-be-transmitted M and an encoding key to provide a ciphertext word C for transmission to a particular decoding device. The encoding key E is a pair of positive integers e and n which are related to the particular decoding device. The message M is a number representative of a message-to-be-transmitted and wherein $$0 \leq M \leq n - 1$$

where n is a composite number of the form $$n = p \cdot q$$

ps where p and q are prime numbers.

For messages represented by numbers outside the range 0 to $n-1$, a conventional blocking means is utilized to break the message into message block words before encoding, where each block word is representative of a number within the specified range. Following subsequent decoding, the recovered block words may be transformed back to the original message.

The presently described encoding device can distinctly encode each of the n possible messages. In alternative but equivalent embodiments, the numbers representative of the possible messages-to-be-transmitted need not be integers in the range 0 to $n-1$, but could be integers selected from each residue class modulo n. For example, where $n=3$, the numbers representative of the set of messages-to-be-transmitted might include $0 (\equiv 0 \mod 3)$, $10 (\equiv 1 \mod 3)$, and $8 (\equiv 2 \mod 3)$. Accordingly, the range limitations for n expressed hereafter in this application are appropriate for the numbers in the modulo residue classes within the respective ranges, but it will be understood that numbers outside the range but selected from the appropriate residue classes are considered to be equivalent to those within the specified range and are intended to be embraced by the claims.

The transformation provided by the encoding device is described by the relation $$C \equiv M^e \pmod{n}$$

where e is a number relatively prime to $(p-1) \cdot (q-1)$.

The particular decoding device is also coupled to the channel and is adapted to receive the ciphertext C from the channel. The decoding device is responsive to the received ciphertext word C and a decoding key to transform that ciphertext to a received message word M'. The decoding key D is a pair of positive integers d and n. M' is a number representative of a deciphered form of C (i.e. reconstituted plaintext) and corresponds to the relation $$M' \equiv C^d \pmod{n}$$

where d is a multiplicative inverse of e(mod(1 cm((p−1), (q−1)))) so that $$e \cdot d \equiv 1(\mathrm{mod}(1\ \mathrm{cm}((p-1),(q-1))))$$

where 1 cm((p−1),(q−1)) is the least common multiple of numbers p−1 and q−1.

With these encoding and decoding devices, a message sent from the encoding device to the decoding device is transformed from M to C by the encoding device, and then back from C to M' by the decoding device, where M'≡M'(mod n).

In a communication system which is adapted to provide digital signatures, each transmitting and receiving terminal is provided with both an encoding and decoding device, each device being functionally equivalent to the devices described above but operating on a different set of input words with a different key. The transmitting terminal decoding device transforms a message M using its own decoding key to generate a signed message $M_s$. Then the encoding device transforms the resultant signed message $M_s$ with the intended receiving terminal's encoding key to generate signed ciphertext word $C_s$. The receiving terminal's decoding device then transforms the received $C_s$ with its own decoding key to obtain the signed message $M_s$, and then the encoding device transforms the resultant signed message with the transmitting terminal's encoding key to obtain the original message. For example, in a system for transmitting signed messages from user A to user B, the terminal for user A includes at least one encoding device characterized by an encoding key $E_B = (e_B, n_B)$ and at least one decoding device, characterized by a decoding key $D_A = (d_A, n_A)$. Similarly, the terminal for user B includes an encoding device characterized by an encoding key $E_A = (e_A, n_A)$ and a decoding device characterized by a decoding key $D_B = (d_B, n_B)$. The encoding and decoding devices of terminals A and B are of the same form described above for the privacy system.

In operation, to provide a signed message, user A first generates a ciphertext signed message word $M_s$ $$M_s \equiv M^{d_A} (\mathrm{mod}\ n_A)$$

and then transforms that signed message word to a signed ciphertext word $C_s$:

$$C_s \equiv M_s^{e_B} (\mathrm{mod}\ n_B)$$

which is then transferred to user B. User A may readily use $d_A$ and $n_A$ from his own decoding key to reduce the signed ciphertext word to a signed message word, and then perform the encoding transformations using $e_B$ and $n_B$ from the publicly available file.

User B deciphers the received $C_s$ into the signed message word $M_s$ in accordance with $$M_s \equiv (C_s)^{d_B} (\mathrm{mod}\ n_B).$$

User B then transforms $M_s$ to M in accordance with $$M \equiv M_s^{e_A} (\mathrm{mod}\ n_A).$$

User B may readily perform his decoding transformations since $d_B$ and $n_B$ are part of his decoding key and $e_A$ and $n_A$ are readily available on the public file.

In any of the above operations, the underlying messages may be initially encoded using conventional encryption techiques, and the subsequently decoded messages may be decoded using a corresponding decryption technique. The present invention may be used with any length messages provided that the message is broken into suitable length blocks before encoding. For example, very long messages may readily be broken into blocks, with each block labelled with a "this is block t of R" notation and transmitted after signing each block separately. Any word to be tansformed, using either the encoding or decoding key for a terminal, must be broken into blocks, wherein each block is representative of a number in the range 0 ton-31 1 for the corresponding terminal. Following transmission over the channel and the second transformation, the resultant words may readily be "unblocked".

The present invention provides a public key system for establishing private communications and also for providing private communications with the signature. A characteristic of this system is that the public revelation of the encryption key does not reveal the corresponding decryption key. As a result, couriers or other secure means are not required to transmit keys, since a message can be enciphered using an encryption key publicly revealed by the intended recipient. Only the intended recipient can decipher the message since only he knows the corresponding decryption key. Furthermore, the message can be "signed" by deciphering it with the privately held decryption key. Anyone can verify the signature using the corresponding publicly revealed encryption key corresponding to the originator. Signatures cannot be forged and the signer cannot later deny the validity of his signature.

In other forms, the present invention may be utilized with both the encoding and decoding keys secret. In such forms, if users A and B wish to communicate privately over an insecure channel, they may use the channel to transmit $E_A$ and $E_B$ to B and A, respectively. Then when A wishes to send B a message M, he first produces $E_B(M) = C$ and sends this to B. B applies $D_B$ to C to obtain M. An eavesdropper on the channel will have access to $E_B$, $E_A$ and C but without access to $D_B$ is unable to decode C.

In alternative forms, the present invention may be utilized with the encoding and decoding devices coupled by a data path to a memory so that encoded only, or encoded signed, data words may be stored in the memory, thereby ensuring file integrity. In such an embodiment, the data path and memory are considered to be a communications channel coupling the encoding and decoding devices (which devices may be at the same physical location). In addition, the present system is suitable for use in access control systems.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
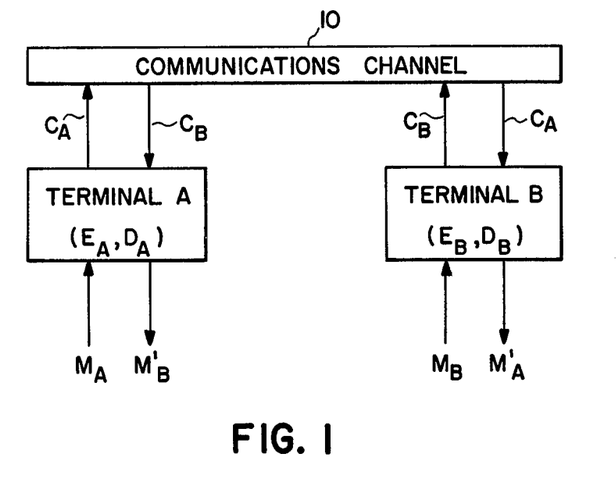
FIG. 1 shows in block diagram form, a communications system in accordance with the present invention.

FIG. 1 shows an embodiment of the present invention in block diagram form. This system includes a communications channel 10 and two terminals A and B coupled to the channel, where each terminal has an associated encoding key E and decoding key D: $E_A$, $D_A$, respectively, for terminal A and $E_B$, $D_B$, respectively, for terminal B. The communications channel 10 may include, for example, a conventional broad-band cable with associated modulator and demodulator equipment at the various remote terminals to permit data transfer between teminals connected to the channel and the channel itself. The system of FIG. 1 is suitable for the two-way transfer of messages between terminal A and terminal B. Each of terminals A and B is adapted to transform a plaintext message to an encoded form and transfer the encoded message over channel 10 to the other terminal. When received at the other terminal, the encoded message is transformed back to its plaintext form. In the figures, the message, encoded form and reconstituted plaintext are represented by the symbols M, C, and M', respectively, with subscripts A or B being representative of the originating terminal.

In one embodiment (e.g. the system of FIG. 2 described below), the encoded form of the message is encrypted to ciphertext that may only be decoded by the intended receiver terminal. In a second embodiment, the encoded form is representative of a message combined with a digital signature indicative of the sending terminal. In a third embodiment (e.g. the system of FIG. 5 described below), the encoded form is both encrypted to a form intelligible only to the intended receiver and also signed by the sending terminal. Alternative form systems may include additional remote terminals (each having associated encoding and decoding keys) coupled to the channel 10, as well as associated terminal and channel equipment so that messages may be addressed to particular ones of the terminals in a conventional manner.

Figure 2:
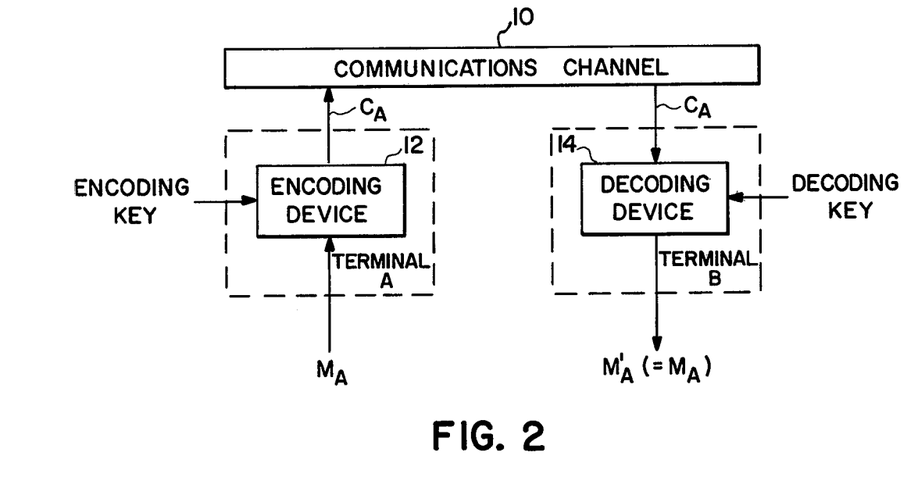
FIG. 2 shows in block diagram form an embodiment of the system of FIG. 1 adapted to transfer enciphered digital messages in one direction between two terminals.

FIG. 2 shows a form of the invention wherein messages $M_A$ may be transferred in encrypted form in one direction from terminal A to terminal B. In this embodiment, terminal A includes an encoding device 12 and terminal B includes a decoding device 14.

Encoding device 12 is adapted to receive an input message $M_A$ to be transferred to the terminal B. Message $M_A$ may be pre-coded by conventional encoding techniques to a digital form. In embodiments, where relatively large messages are being utilized, the pre-coded form may be in terms of short data blocks which may be individually encoded by the device 12 into corresponding words of ciphertext $C_A$. To establish communications with terminal B, the encoding device 12 performs the transformation from $M_A$ to $C_A$ utilizing the terminal B encoding key, $E_B$ (defined more fully below). The decoding device 14 receives ciphertext words $C_A$ from the channel 10 and transforms them into reconstituted plaintext from $M_A'$ utilizing the terminal B decoding key, $D_B$ (defined more fully below). The encoding and decoding keys are adapted so that the decoded message $M_A'$ is the same as the message $M_A$. To establish communication with any other terminal, the encoding device 12 of the sending terminal utilizes the encoding key associated with the intended receiver terminal. The decoding device 14 of the receiving terminal utilizes its own decoding key to transform the received ciphertext to plaintext.

In accordance with the present invention, for the $i^{th}$ terminal, the encoding key $E_i$ is a pair of positive integers $e_i$ and $n_i$ specifically associated with that terminal, and the decoding key is a pair of positive integers $d_i$ and $n_i$ where $d_i$ is also specifically associated with that terminal. In accordance with the invention, $n_i$ is a composite number equal to the product of prime factors $p_i$ and $q_i$, $e_i$ is relatively prime to $(p_i-1)\cdot(q_i-1)$, and $d_i$ is a multiplicative inverse of $e_i(\mod(1\ cm((p_i-1), (q_i-1))))$. By way of example, $d_i$ can be a multiplicative inverse of $e_i(\mod(p_i-1)\cdot(q_i-1))$.

The encoding transformation performed by the $i^{th}$ terminal encoding device for a message destined for the $j^{th}$ terminal is in accordance with the relation:

$$C_i = M_i^{e_j}(\mod n_j).$$

The message $M_i$ is a number in the range $0 \leq M_i \leq n_j - 1$. This condition may be met by initially transforming, or pre-coding, the message-to-be-transmitted into blocks which are in that range at the $i^{th}$ terminal, and then recombining the blocks at the $j^{th}$ terminal. The decoding transformation performed by the $j^{th}$ terminal decoding device for the ciphertext received from the $i^{th}$ terminal is in accordance with the relation:

$$M_i' = C_i^{d_j}(\mod n_j).$$

Accordingly, the encoding device 12 and decoding device 14 perform substantially the same functional operation but with different message inputs (M or C) and different keys (E or D). In the present exemplary embodiment which transfers an encrypted message from terminal A to terminal B, i=A and j=B.

The FIG. 2 embodiment is also suitable for sending signed messages $M_{As}$ (in lieu of $C_A$) from terminal A to terminal B. In this form, the system of FIG. 2 is substantially the same as that described above except that terminal A utilizes its own decoding key $D_A$ as the "encoding key" for device 12, and terminal B utilizes terminal A's encoding key for the "decoding key" for device 14. With this configuration, $M_A$ is in the range $0 \leq M_A \leq n_A - 1$ and terminal A transforms the message $M_A$ to $M_{As}$ in accordance with:

$$M_{As} = M_A^{d_A}(\mod n_A)$$

and terminal B transforms the received signed message $M_{As}$ back to $M_A$ in accordance with:

$$M_A \equiv M_{As}{}^{e_A} (\text{mod } n_A).$$

Figure 3:
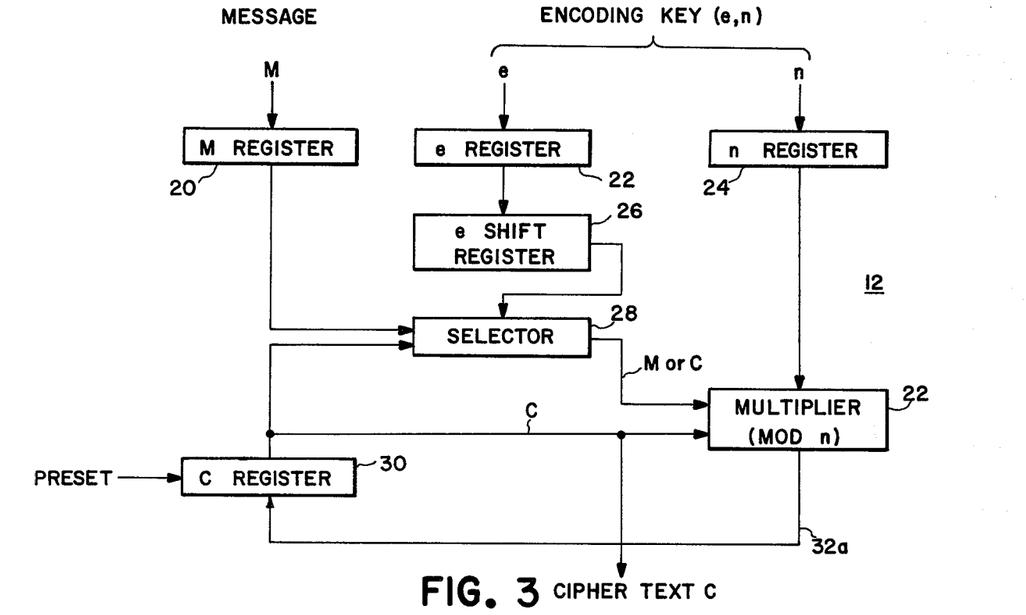
FIG. 3 shows in detailed block diagram form, the encoding device in the system of FIG. 2.

An exemplary form for the encoding device 12 is shown in FIG. 3. The device 12 includes an M register 20 for receiving an applied digital message-to-be-transferred and e register 22 and n register 24 for receiving an applied encoding key consisting of binary signals representative of the numbers e and n for the intended receiver terminal (which, in a public key cryptographic system, are readily available from a public file for all terminals). Encoding device 12 further includes an e shift register 26, a multiplier selector 28, ciphertext register 30 and a modulo n multiplier 32. These blocks in the device 12 are conventionally arranged together with timing control circuitry to perform "exponentiation by repeated squaring and multiplication." In alternative embodiments, other exponentiation procedures may readily be utilized in keeping with the present invention.

In the operation of device 12 after a message M is loaded into the message register 20, the ciphertext register 30 is preset to the number 1 and the e and n registers are loaded with binary words representative of the numbers e and n, respectively, for the intended receiver terminal. The shift register 26 is clocked to shift the bits of the e word so that one bit at a time starting with the most significant bit is applied to the control input of the multiplier selector 28. In response to each applied e word bit, the current contents of C register 30 are applied as a first input to multiplier 32. In addition, the selector 28 selects the contents of C register 30 as a second input to multiplier 32, and the multiplier 32 then is activated to provide an intermediate product (modulo n) of the signals at its first and second inputs, thereby effecting a squaring (modulo n) of the contents of C register 30. C register 30 is then updated with the intermediate product signal, which is in turn applied to the first input of multiplier 32. The selector 28 then selects either the contents of M register 20 (if the currently applied e word bit is 1) or binary 1 (if the currently applied e word bit is 0) as the second input of multiplier 32, and the multiplier 32 is activated to provide a final product (modulo n) of the signals at its first and second inputs. The C register 30 is then updated with the final product signal. The e shift register is then activated to shift the e word by one bit so that the next e word bit is applied to selector 28 and the above operation repeats. Following the completion of the above operation for the last bit of the e word, the contents of the C register 30 are representative of the ciphertext corresponding to the applied message M, and is ready for transmission over the communications channel 10. In alternative configurations, the transformation of the message M to the ciphertext C may be accomplished using a programmed digital computer rather than the hardware elements illustrated in FIG. 3.

The decoding device 14 is substantially the same as the illustrated encoding device illustrated in FIG. 3, except that the message applied to the register corresponding to register 20 is replaced by the ciphertext word received from the communication channel 10, and the encoding key (e, n) words applied to the registers corresponding to registers 22 and 24 are replaced by the decoding key (d, n) words for the terminal. In this configuration, the register corresponding to register 30 contains intermediate and final product signals corresponding to the deciphered message M', and the blocks corresponding to blocks 26, 28 and 32 perform the same functions in their corresponding elements in the encoding device 12, but for the numbers d and n. As in the encoding device 12, timing control circuitry is adapted to control the sequential operation of those elements in the manner described. The device of FIG. 3 is also suitable for the signed message mode of operation, with the substitution of the appropriate encoding and decoding keys.

Figure 4:
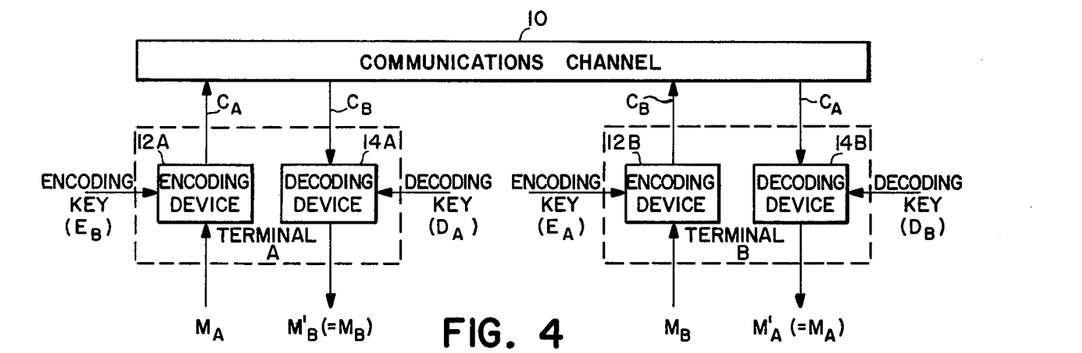
FIG. 4 shows in block diagram form an embodiment of the system of FIG. 1 adapted to transfer enciphered digital messages in two directions between two terminals.

The communications system illustrated in FIG. 2 is suitable for one-directional communicating messages from terminal A to terminal B. FIG. 4 illustrates a similar configuration which accommodates the two-way transmission of messages between terminals A and B. In a similar manner, additional terminals may be added to the network (with suitable selection of encoding keys for each desired communication) and coupled to the communications channel 10 by way of conventional modulator and demodulator networks and terminal addressing networks to control the appropriate flow of messages from originating terminal to a desired receiving terminal.

In the FIG. 4 configuration, separate encoding and decoding devices are shown for each terminal. However, as noted above, the encoding and decoding devices perform substantially the same functions but with different input message and key signals. Accordingly, each of the stations at remote locations A and B in the FIG. 4 configuration may be replaced by a single device which may be operated as either an encoding or a decoding device with appropriate switches to control the message input (M or C) and key input (E or D). In the configuration of FIG. 4, the origin for the message, reconstituted plaintext and ciphertext is denoted by subscripts representative of the respective originating terminal. In addition, the encoding and decoding keys are representative by the letters E and D with subscripts representative of the associated terminal. For example, since terminal A is communicating with terminal B, the encoding key is denoted $E_B$ so that the decoding terminal B may apply its decoding key $D_B$ to extract the message M' of $A(=M_A)$. For cases where terminal A wishes to communicate with a third terminal, for example, terminal C, the encoding key for the terminal A encoding device 14A would be replaced with a corresponding encoding key $E_C$ for terminal C.

Figure 5:
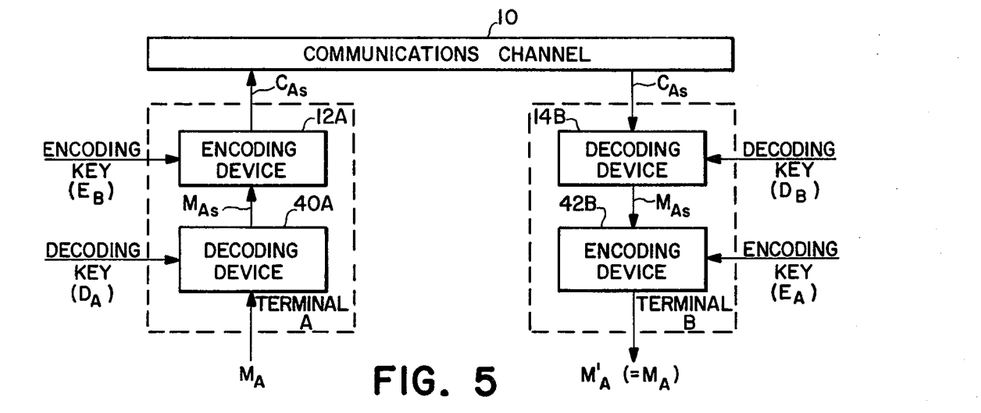
FIG. 5 shows in block diagram form, an embodiment of the system of FIG. 1 adapted to transfer signed, enciphered digital messages in one direction between two terminals.

FIG. 5 shows an embodiment of a communication system in accordance with the present invention for transmitting signed messages from terminal A to terminal B over the communication channel 10. In this configuration, the terminal A includes an encoding device 12A which corresponds to the encoding device 12 in the FIG. 2 configuration and which similarly transforms a message to ciphertext using the encoding key for the intended receiver terminal (i.e., terminal B in this case). In addition, terminal A includes a decoding device 40A which is similar in form to the decoding device 14 (FIG. 2), but which utilizes the decoding key $D_A$ associated with terminal A as the key for that device 40A. The device 40 transforms the message to be transmitted $M_A$ to a signed message $M_{As}$, which in turn is applied as the message word input to device 12A. Device 12A provides a signed ciphertext word $C_{As}$ which is representative of the signed message word as enciphered for reception by terminal B. $C_{As}$ is transferred to terminal B over channel 10.

Terminal B includes a decoding device 14B which corresponds to the decoding device 14 in the FIG. 2 configuration and which transforms received signed ciphertext word $C_{As}$ to the signed message word $M_{As}$ using terminal B's decoding key $D_B$. In addition, terminal B includes an encoding device 42B which is similar in form to the encoding device 12A, but which utilizes the signed message word $M_{AS}$ as its data input and the encoding key $E_A$ associated with terminal A as the key for that device 42B. Device 42B transforms the signed message word $M_{As}$ to the unsigned message word $M_A'$, which corresponds to the original message $M_A$. Thus, all of the devices 12A, 14B, 40A, and 42B are substantially the same in function but they utilize the indicated encoding or decoding keys and data inputs.

In alternative embodiments, the order of the enciphering and signing operations may be switched, provided that the order of the corresponding deciphering and unsigning operations are similarly switched. Furthermore, additional levels of enciphering or signing may also be utilized so long as there is a corresponding deciphering or unsigning operation.

Figure 6:
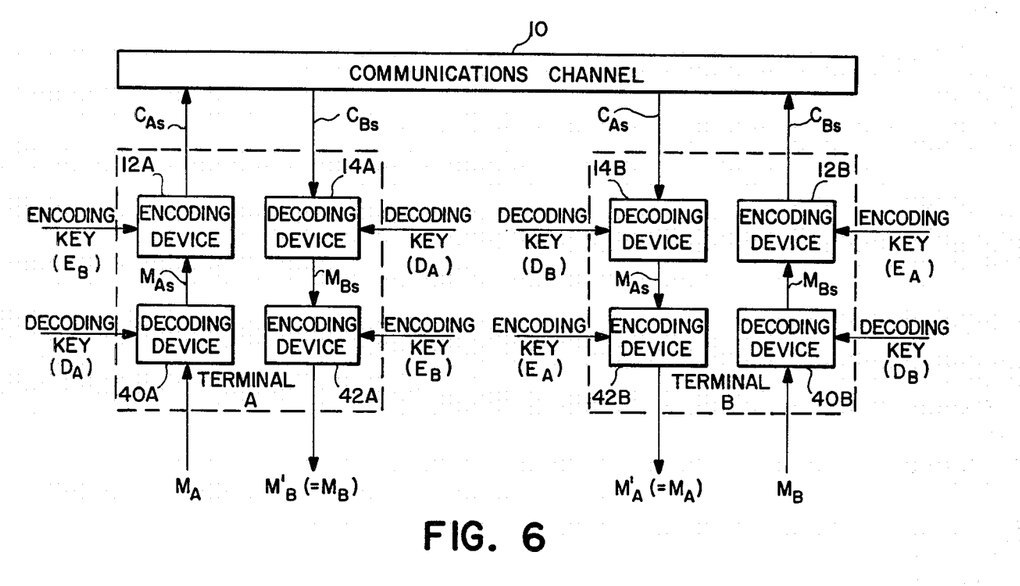
FIG. 6 shows in block diagram form, an embodiment of the system of FIG. 1 adapted to transfer signed, enciphered digital messages in two directions between two terminals.

While the system in FIG. 5 is suitable for signal direction transmission of a message from terminal A to terminal B, terminal B may also include blocks corresponding to blocks 12A and 40A and terminal A may include blocks corresponding to blocks 14B and 42B with the respective keys $E_A$, $D_B$, $D_A$ and $E_B$, as shown in FIG. 6. With the latter system, two-way signed digital communications may be accomplished. In alternative configurations, additional terminals may be utilized using the addition of similar blocks coupled to the channel 10, with the appropriate keys and modem and addressing networks.

Figure 7:
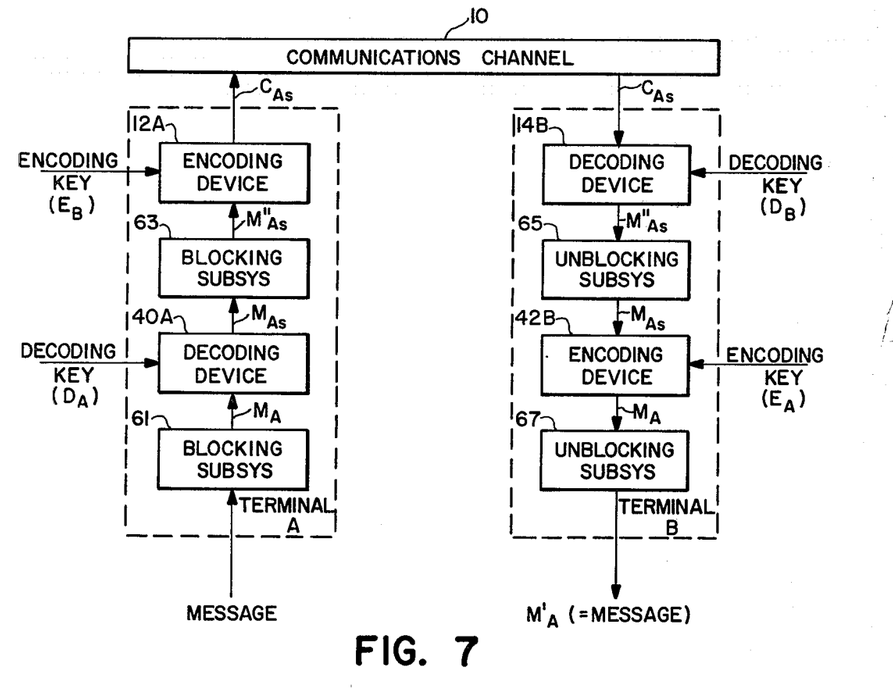
FIG. 7 shows in block diagram form, an embodiment of the system of FIG. 1 adapted to transfer blocked messages in one direction between two terminals.

The signature systems described above in conjunction with FIGS. 2, 4, 5, and 6 are suitable where the respective message and ciphertext words represent numbers less than the $n_i$ for the particular transformations. As noted above, when the words to be transformed (either by encoding or decoding) are initially beyond the nominal range requirement, a blocking subsystem is used to break the word into blocks within that range before the transformation is performed. A corresponding unblocking subsystem is utilized following the inverse transformation at the receiving terminal to obtain the original message. FIG. 7 shows an exemplary configuration which is similar to the configuration of FIG. 5, but which also includes blocking and unblocking subsystems. Terminal A of the configuration of FIG. 7 includes a first blocking subsystem 61 which precodes the message to a blocked message $M_A$, which in turn is transformed by device 40A to a signed message $M_{As}$. A second blocking subsystem 63 transforms $M_{As}$ to blocks $M_{As}''$ each block of which is then transformed by device 12A to a signed ciphertext word $C_{As}$. At terminal B, $C_{As}$ is first transformed to signed message blocks $M_{As}''$ by device 14B, which are then transformed by a first unblocking subsystem 65 to the signed message word $M_{As}$. The word $M_{As}$ is then transformed by device 42B to the blocked message $M_A$, which is in turn transformed by a second unblocking subsystem 67 to the original message. In embodiments where the message is enciphered before signing, the device that first provides $C_A$ which is transformed to $C_A''$ and then to $C_{As}$. At the receiving terminal $C_{As}$ is first transformed to $C_A''$ which is then transformed to $C_A$ and then decoded to $M_A$.

The blocking and unblocking subsystems may be configured with any of the various forms of the present invention wherein the respective message and ciphertext words are outside the nominal ranges. Where the range requirements for a word transformation are met, the blocking and unblocking subsystems are not utilized.

The encoding operation for the present invention will now be illustrated for the case where $p=47$, $q=59$, $n=p\cdot q=47\cdot 59=2773$, $d=157$ and $e=17$, to encode the message:

ITS ALL GREEK TO ME

Initially, the message is encoded with two English letters in a block, by substituting for each letter a two-digit number: blank=00, A=01, B=02, ..., Z=26. In this form, the message is precoded to:

$$M = 0920190001121200071805051100201500130500$$

Since this value for M is greater than n(=2773), M is broken into blocks $M_1, \ldots, M_{10}$ as follows:

$$M = M_1\ M_2\ M_3\ M_4\ M_5\ M_6\ M_7\ M_8\ M_9\ M_{10}$$
$$= 0920\ 1900\ 0112\ 1200\ 0718\ 0505\ 1100\ 2015\ 0013\ 0500$$

Since $e=10001$ in binary, the first block ($M_1=0920$) is enciphered using the encoding key $E=(17,2773)$ to a corresponding ciphertext block $C_1$:

$$C_1 \equiv M_1^e \pmod{n}$$
$$\equiv M_1^{17} \pmod{2773}$$
$$\equiv ((((1)^2 \cdot M)^2)^2)^2)^2 \cdot M \pmod{2773}$$
$$\equiv 948 \pmod{2773}$$

The whole message is enciphered as:

$$C = C_1\ C_2\ C_3\ C_4\ C_5\ C_6\ C_7\ C_8\ C_9\ C_{10}$$
$$= 0948\ 2342\ 1084\ 1444\ 2663\ 2390\ 0778\ 0774\ 0219\ 1655$$

The ciphertext can be deciphered in a similar manner using the decoding key $D=(157, 2773)$. For the first block $C_1$:

$$M'_1 \equiv C_1^d \pmod{n}$$
$$\equiv 948^{157} \pmod{2773}$$
$$\equiv 920 \pmod{2773}$$

The other blocks are similarly deciphered so that the various blocks may be put together to form M, and then be decoded (by reversing the letter-to-two-digit-number transformation) to the original message.

In a public key cryptosystem utilizing the present invention, each user has an associated encryption key $E=(e,n)$ and decryption key $D=(d,n)$, wherein the encryption keys for all users are available in a public file, while the decryption keys for the users are only known to the respective users.

In order to maintain a high level of security in such systems, a user's decoding key is not determinable in a practical manner from that user's encoding key. Since $$e \cdot d \equiv 1 \, (\mathrm{mod}(1 \, \mathrm{cm}((p-1), (q-1)))).$$

d can be determined from e provided p and q are also known. Accordingly, the security of the system is dependent upon the ability to determine p and q which are the prime factors of n. By selecting p and q to be large primes, the resultant composite number n is also large, and correspondingly difficult to factor. For example, using known computer-implemented factorization methods, on the order of $10^9$ years is required to factor a 200 digit long number. Thus, as a practical matter, although a user's encryption key $E=(e,n)$ is public, the prime factors p and q of n are effectively hidden from anyone due to the enormous difficulty in factoring n. These aspects of the present invention are described more fully in the present inventors' publication "On Digital Signatures and Public-Key Cryptosystems", MIT/LCS/TM-82, NTIS No. ADA-039036, April 1977.

In general, the present invention provides secure communications as a practical matter because the operation of evaluating a polynomial modulo n, where n is a large composite number, may be easily inverted only with the knowledge of the factors of n. In the preferred embodiment described above, $n=p \cdot q$, where p and q are prime, and the message M is transformed by evaluating the polynomial $f(M)=M^e$ modulo n, where $\gcd(e,(p-1)\cdot(q-1))=1$.

In alternative embodiments, the present invention may use a modulus n which is a product of three or more primes (not necessarily distinct). Decoding may be performed modulo each of the prime factors of n and the results combined using "Chinese remaindering" or any equivalent method to obtain the result modulo n.

In still other embodiments, the message M may be encoded to ciphertext C by evaluating a polynomial $a_e M^e + a_{e-1} M^{e-1} + \ldots + a_0$ modulo n where e and $a_e$, $a_{e-1}, \ldots, a_0$ are numbers. In such embodiments, C may be decoded utilizing conventional root-finding techniques, choosing which of any roots is the proper decoded version, for example, by the internal redundancy of the message. Where e is relatively prime to the Euler totient function of n, $\emptyset(n)$, and where $a_e=1$ and $a_{e-1}, \ldots, a_0$ equal zero, C may be decoded to M' in accordance with $$M' \equiv C^d (\mathrm{mod} \, n)$$

where d is the multiplicative inverse of $e(\mathrm{mod}(\lambda(n)))$ where $\lambda(n)$ is the least positive integer such that $$S^{\lambda(n)} \equiv 1 (\mathrm{mod} \, n)$$

for all integers S relatively prime to n.

In yet other embodiments, the message M may be encoded to ciphertext C by the performance of an ordered succession of invertible operations (modulo n) on M, with the succession including at least exponentiation, and in various embodiments, such other invertible operations as adding, subtracting, multiplying or dividing by constants (positive or negative), and simple bit manipulations (e.g. complementing or permuting bits). Decoding is accomplished by applying a second succession of invertible operations on C, with each of the operations of the second succession corresponding to one of the operations in the encoding succession, where the operations of the second succession are in reverse order with respect to the corresponding inverse operations of the encoding succession. By way of example, M may be encoded to C as follows:

$$C \equiv E(M) \equiv (M^{13}+2)^{17} \cdot 4 (\mathrm{mod}(11 \cdot 7)).$$

This ciphertext word C is decoded as $$M \equiv D(C) \equiv ((C/4)^{23} - 2)^7 (\mathrm{mod}(11 \cdot 7))$$

where 23 and 13 are the multiplicative inverses of 17, and 13, respectively, modulo $1 \, \mathrm{cm}(11-1, 7-1)$.

Similarly, the following variations on the use of the encoding/decoding devices are to be considered as obvious to one skilled in the prior art and therefore within the intended scope of the attached claims:

(1) using the encoding/decoding devices in cipher-feedback mode instead of the simple block encoding method described here, or as a pseudo-random number generator for use to generate pads, (2) signatures may be effected by signing a transformed version of the message, where the transformation is publicly known and is not necessarily invertible. (It may, for example, compress the message to be signed into a shorter form, thus giving shorter signatures).

(3) using the present invention to transmit keys to be used in another encryption method for encoding subsequent messages.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A cryptographic communications system comprising:
   A. a communications channel,
   B. an encoding means coupled to said channel and adapted for transforming a transmit message word signal M to a ciphertext word signal C and for transmitting C on said channel,
   where M corresponds to a number representative of a message and $$0 \leq M \leq n-1$$

where n is a composite number of the form $$n = p \cdot q$$

where p and q are prime numbers, and
   where C corresponds to a number representative of an enciphered form of said message and corresponds to $$C \equiv M^e (\mathrm{mod} \, n)$$

where e is a number relatively prime to $1 \, \mathrm{cm}(p-1, q-1)$, and
   C. a decoding means coupled to said channel and adapted for receiving C from said channel and for transforming C to a receive message word signal M'
   where M' corresponds to a number representative of a deciphered form of C and corresponds to $$M' \equiv C^d (\mod n)$$

where d is a multiplicative inverse of e(mod(1 cm((p−1),(q−1)))).

2. A system according to claim 1 wherein at least one of said transforming means comprises:
 a first register means for receiving and storing a first digital signal representative of said signal-to-be-transformed,
 a second register means for receiving and storing a second digital signal representative of the exponent of the equivalence relation defining said transformation,
 a third register means for receiving and storing a third digital signal representative of the modulus of the equivalency relation defining said transformation, and
 an exponentiation by repeated squaring and multiplication network coupled to said first, second and third register means, said network including:
  A. an output register means for receiving and storing a first multiplier signal and for applying said first multiplier signal to a first multiplier input line,
  B. selector means for successively selecting each of the bits of said second digital signal as a multiplier selector signal,
  C. means operative for each of said multiplier selector signals for selecting as a second multiplier signal either the contents of said output register means or the contents of said first register means, and for said second applying multiplier signal to a second multiplier input line, said selection being dependent on the binary value of the successive bits of said second digital signal, and
  D. modulo multiplier means operative in step with said selector means and responsive to said first and second multiplier signals on said first and second multiplier input lines for successively generating first multiplier signals and for transferring said first multiplier signals to said output register means, said first multiplier signal initially being representative of binary 1, and thereafter being representative of the modulo product of said first and second multiplier signals, where the modulus of said modulo product corresponds to said third digital signal.

3. A communications system for transferring message signals $M_i$, comprising k terminals, wherein each terminal is characterized by an encoding key $E_i = (e_i, n_i)$ and decoding key $D_i = (e_i, n_i)$, where i = 1,2, . . . ,k, and wherein
 $M_i$ corrresponds to a number representative of a message signal to be transmitted from the $i^{th}$ terminal, and $$0 \leq M_i \leq n_i - 1,$$

$n_i$ is a composite number of the form $$n_i = p_i q_i$$

$p_i$ and $q_i$ are prime numbers,
$e_i$ is relatively prime to 1 cm(p−1,q−1),
$d_i$ is a multiplicative inverse of $$e_i(\mod(1 \; cm((p_i - 1), (q_i - 1))))$$

wherein a first terminal includes means for encoding a digital message word signal $M_a$ for transmission from said first terminal (i = A) to a second terminal (i = B), said first terminal including:
 means for transforming said message word signal $M_A$ to a signed message word signal $M_{As}$, $M_{As}$ corresponding to a number representative of an encoded form of said message word signal $M_A$, whereby:

$$M_{As} \equiv M_A{}^{d_A} (\mod n_A).$$

4. A system according to claim 3 wherein at least one of said transforming means comprises:
 a first register means for receiving and storing a first digital signal representative of said signal-to-be-transformed,
 a second register means for receiving and storing a second digital signal representative of the exponent of the equivalence relation defining said transformation,
 a third register means for receiving and storing a third digital signal representative of the modulus of the equivalency relation defining said transformation, and
 an exponentiation by repeated squaring and multiplication network coupled to said first, second and third register means, said network including:
  A. an output register means for receiving and storing a first multiplier signal and for applying said first multiplier signal to a first multiplier input line,
  B. selector means for successively selecting each of the bits of said second digital signal as a multiplier selector signal,
  C. means operative for each of said multiplier selector signals for selecting as a second multiplier signal either the contents of said output register means or the contents of said first register means, and for said second applying muliplier signal to a second multiplier input line, said selection being dependent on the binary value of the successive bits of said second digital signal, and
  D. modulo multiplier means operative in step with said selector means and responsive to said first and second multiplier signals on said first and second multiplier input lines for successively generating first multiplier signals and for transferring said first multiplier signals to said output register means, said first multiplier signal initially being representative of binary 1, and thereafter being representative of the modulo product of said first and second multiplier signals, where the modulus of said modulo product corresponds to said third digital signal.

5. The system of claim 3 further comprising:
 means for transmitting said signal message word signal $M_{As}$ from said first terminal to said second terminal, and
 wherein said second terminal includes means for decoding said signed message word signal $M_{As}$ to said message word signal $M_A$, said second terminal including:
 means for transforming said ciphertext word signal $C_A$ to said message word signal $M_A$, whereby $$M_A \equiv M_{As}{}^{e_A}(\mod n_A).$$

6. The system of claim 3 wherein said encoding means further comprises:

means for transforming said sfgned message word signal $M_{As}$ to one or more signed message block word signals $M_{As}''$, each block word signal $M_{As}''$ corresponding to a number representative of a portion of said signed message word signal $M_A$ in the range $0 \leq M_{As}'' \leq n_B - 1$, and means for transforming each of said signed message block word signals $M_{As}''$ to a signed ciphertext word signal $C_{As}$, $C_{As}$ corresponding to a number representative of an encoded form of said signed message block word signal, whereby $$C_{As} = M_{As}''^{eB} (\text{mod } n_B).$$

7. The system of claim 6 comprising the further steps of:

means for transmitting said signed ciphertext word signal $C_{As}$ from said first terminal to said second terminal, wherein said second terminal includes means for decoding said signed ciphertext word signals to said message word signal $M_A$, said second terminal including:

means for transforming each of said signed ciphertext word signal $C_{As}$ to one of said signed message block word signals $M_{As}''$, whereby $$M_{As}'' = C_{As}^{dB} (\text{mod } n_B)$$

means for transforming said signed message block word signals to said signed message word signal $M_{As}$ means for transforming said sfgned message word signal to safd message word signal $M_A$, whereby $$M_A = M_{As}^{eA} (\text{mod } n_A).$$

8. A communications system for transferring a message signal $M_i$ comprising k terminals, wherein each terminal is characterized by an encoding key $E_i = (e_i, n_i)$ and decoding key $D_i = (e_i, n_i)$, where $i = 1, 2, \ldots, k$, and wherein $M_i$ corresponds to a number representative of a message signal to be transmitted from the $i^{th}$ terminal, $n_i$ is a composite number of the form $$n_i = p_i q_i$$

$P_i$ and $q_i$ are prime numbers, $e_i$ is relatively prime to $1 \text{ cm}(p_i - 1, q_i - 1)$, $d_i$ is a multiplicative inverse of $$e_i (\text{mod}(1 \text{ cm}((p_i - 1),(q_i - 1))))$$

wherein a first terminal includes means for encoding a digital message word signal $M_A$ for transmission from said first terminal ($i = A$) to a second terminal ($i = B$), said first terminal including:

means for transforming said message word signal $M_A$ to one or more message block word signals $M_A'$, each block word signal $M_A$ being a number representative of a portion of said message word signal $M_A$ in the range $0 \leq M_A \leq n_B - 1$, means for transforming each of said message block word signals $M_A''$ to a ciphertext word signal $C_A$, $C_A$ corresponding to a number representative of an encoded form of said message block word signal $M_A''$, whereby:

$$C_A = M_A''^{eB} (\text{mod } n_B).$$

9. A system according to claim 8 wherein at least one of said transforming means comprises:

a first register means for receiving and storing a first digital signal representative of said signal-to-be-transformed, a second register means for receiving and storing a second digital signal representative of the exponent of the equivalence relation defining said transformation, a third register means for receiving and storing a third digital signal representative of the modulus of the equivalency relation defining said transformation, and an exponentiation by repeated squaring and multiplication network coupled to said first, second and third register means, said network including:

A. an output register means for receiving and storing a first multiplier signal and for applying said first multiplier signal to a first multiplier input line, B. selector means for successively selecting each of the bits of said second digital signal as a multiplier selector signal, C. means operative for each of said multiplier selector signals for selecting as a second multiplier signal either the contents of said output register means or the contents of said first register means, and for said second applying multiplier signal to a second multiplier input line, said selection being dependent on the binary value of the successive bits of said second digital signal, and D. modulo multiplier means operative in step with said selector means and responsive to said first and second multiplier signals on said first and second multiplier input lines for successively generating first multiplier signals and for transferring said first multiplier signals to said output register means, said first multiplier signal initially being representaative of binary 1, and thereafter being representative of the modulo product of said first and second multiplier signals, where the modulus of said modulo product corresponds to said third digital signal.

10. The system of claim 8 further comprising:

means for transmitting said ciphertext word signals from said first terminal to said second terminal, and wherein said second terminal includes means for decoding said ciphertext word signals to said message word signal $M_A$, said second terminal including:

means for transforming each of said ciphertext word signals $C_A$ to one of said message block word signals $M_A''$, whereby $$M_A = C_A^{dB} (\text{mod } n_B)$$

means for transforming said message block word signals $M_A''$ to said message word signal $M_A''$.

11. The system of claim 8 wherein said encoding means further comprises:

means for transforming said ciphertext word signal $C_A$ to one or more ciphertext block word signals $C_A''$, each block word signal $C_A''$ being a number representative of a portion of said ciphertext word signal $C_A$ in the range $0 \leq C_A'' \leq n_A - 1$, means for transforming each of said ciphertext block word signals $C_A''$ to a signed ciphertext word signal $C_{As}$ corresponding to a number representative of an encoded form of said ciphertext block word signal $C_A''$, whereby $$C_{As} \equiv C_A''^{d_A} (\bmod\ n_A).$$

12. The system of claim 11 further comprising:
means for transmitting said signed ciphertext word signals from said first terminal to said second terminal,
wherein said second terminal includes means for decoding said signed ciphertext word signals to said message word signal $M_A$, said second terminal including:
means for transforming each of said signed ciphertext word signals $C_{AS}$ to one of said ciphertext block word signals $C_A''$, whereby $$C_A'' \equiv C_{As}^{e_A} (\bmod\ n_A)$$

means for transforming said ciphertext block word signals to said message block word signals, whereby $$M_A'' \equiv C_A''^{d_B} (\bmod\ n_B)$$

means for transforming said message block word signals to said message word signal $M_A$.

13. A communications system having a plurality of terminals coupled by a communications channel, including a first terminal characterized by an associated encoding key $E_A = (e_A, n_A)$ and decoding key $D_A = (d_A, n_A)$, and including a second terminal, wherein
$n_A$ is a composite number of the form $$n_A = p_A \cdot q_A$$

$p_A$ and $q_A$ are prime numbers,
$e_A$ is relatively prime to $1\ cm(p_A-1, q_A-1)$,
$d_A$ is a multiplicative inverse of $$e_A(\bmod(1\ cm((p_A-1),(q_A-1)))).$$

wherein said first terminal comprises:
encoding means coupled to said channel and adapted for transforming a transmit message word signal $M_A$ to a signed message word signal $M_{As}$ and for transmitting $M_{As}$ on said channel,
where $M_A$ corresponds to a number representative of a message and $$0 \leq M_A \leq n_A - 1$$

where $M_{As}$ corresponds to a number representative of a signed form of said message and corresponds to $$M_{As} \equiv M_A^{d_A} (\bmod\ n_A)$$

wherein said second terminal comprises:
decoding means coupled to said channel and adapted for receiving $M_{As}$ from said channel and for transforming $M_{As}$ to a receive message word signal $M_A'$
where $M_A'$ corresponds to a number representative of an unsigned form of $M_A$ and corresponds to $$M_A' \equiv M_{As}^{e_A} (\bmod\ n_A).$$

14. A system according to claim 13 wherein at least one of said transforming means comprises:
a first register means for receiving and storing a first digital signal representative of said signal-to-be-transformed,
a second register means for receiving and storing a second digital signal representative of the exponent of the equivalence relation defining said transformation,
a third register means for receiving and storing a third digital signal representative of the modulus of the equivalency relation defining said transformation, and
an exponentiation by repeated squaring and multiplication network coupled to said first, second and third register means, said network including:
A. an output register means for receiving and storing a first multiplier signal and for applying said first multiplier signal to a first multiplier input line,
B. selector means for successively selecting each of the bits of said second digital signal as a multiplier selector signal,
C. means operative for each of said multiplier selector signals for selecting as a second multiplier signal either the contents of said output register means or the contents of said first register means, and for said second applying multiplier signal to a second multiplier input line, said selection being dependent on the binary value of the successive bits of said second digital signal, and
D. modulo multiplier means operative in step with said selector means and responsive to said first and second multiplier signals on said first and second multiplier input lines for successively generating first multiplier signals and for transferring said first multiplier signals to said output register means, said first multiplier signal initially being representative of binary 1, and thereafter being representative of the modulo product of said first and second multiplier signals, where the modulus of said modulo product corresponds to said third digital signal.

15. The system according to claim 13 wherein said second terminal is characterized by an associated encoding key $E_B = (e_B, n_B)$ and decoding key $D_B = (d_B, n_B)$, where:
$n_B$ is a composite number of the form $$n_B = p_B \cdot q_B$$

$p_B$ and $q_B$ are prime numbers,
$e_B$ is relatively prime to $1\ cm(p_B-1, q_B-1)$,
$d_B$ is a multiplicative inverse of $$e_B(\bmod(1\ cm((p_B-1),(q_B-1)))).$$

wherein said second terminal comprises:
encoding means coupled to said channel and adapted for transforming a transmit message word signal $M_B$ to a signed message word signal $M_{Bs}$ and for transmitting $M_{Bs}$ on said channel,
where $M_B$ corresponds to a number representative of a message and $$0 \leq M_B \leq n_B - 1$$

where $M_{Bs}$ corresponds to a number representative of an enciphered form of said message signal $M_B$ and corresponds to $$M_{Bs} \equiv M_B^{d_B} (\bmod\ n_B)$$

wherein said first terminal comprises:

decoding means coupled to said channel and adapted for receiving $M_{Bs}$ from said channel and for transforming $M_{Bs}$ to a receive message word signal $M_B'$ where M' is a number representative of an unsigned form of C and corresponds to $$M_B' \equiv M_{Bs}{}^{e_B} \pmod{n_B}.$$

16. The system according to claim 13 wherein said second terminal is characterized by an associated encoding key $E_B=(e_B, n_B)$ and decoding key $D_B=(d_B, n_B)$, where:

$n_B$ is a composite number of the form $$n_B = p_B \cdot q_B$$

$p_B$ and $q_B$ are prime numbers, $e_B$ is relatively prime to $1 \; cm(p_B-1, q_B-1)$, $d_B$ is a multiplicative inverse of $e_B (\mod 1 \; cm((p-1),(q-1)))$, wherein said encoding means of said first terminal is adapted for transforming said message word signal $M_A$ to a signed ciphertext word signal $C_{As}$, and for transmitting $C_{As}$ on said channel in place of $M_{As}$ whereby $C_{As}$ corresponds to a number representative of a signed enciphered form of said message and corresponds to:

$$C_{As} \equiv M_{As}''{}^{e_B} \pmod{n_B}$$

where $M_{As}''$ corresponds to a number representative of a block of said signed message word signal $M_{As}$ in the range $0 \leq M_{As}'' \leq n_B - 1$ wherein said decoding means of said second terminal is adapted to first transform said signed enciphered form of said message $C_{As}$ to $M_{As}$ in accordance with:

$$M_{As}' \equiv C_{As}{}^{d_B} \pmod{n_B}$$

then to transform $M_{As}''$ to $M_{As}$, and then to transform $M_{As}$ to said receive message word signal $M_A'$, where $M_A'$ is a number representative of a deciphered form of $C_{As}$ and corresponds to $$M_A \equiv M_{As}{}^{e_A} \pmod{n_A}.$$

17. The system according to claim 15
wherein said encoding means of said first terminal is adapted for transforming said message word signal $M_A$ to a signed ciphertext word signal $C_{As}$, and for transmitting $C_{As}$ on said channel in place of $M_{As}$, whereby $C_{As}$ corresponds to a number representative of a signed enciphered form of said message and corresponds to:

$$C_{As} \equiv M_{As}''{}^{e_B} \pmod{n_B}$$

wherein said decoding means of said second terminal is adapted to first transform said signed enciphered form of said message $C_{As}$ to $M_{As}''$ in accordance with:

$$M_{As}'' \equiv C_{As}{}^{r_B} \pmod{n_B}$$

then to transform $M_{As}$ to $M_{As}$, and then to transform $M_{As}$ to said receive message word signal $M_A'$, where $M_A'$ corresponds to a number representative of a deciphered form of $C_{As}$ and corresponds to $$M_A' \equiv M_{As}{}^{e_A} \pmod{n_A}$$

wherein further said encoding means of said second terminal is adapted for transforming said message word signal $M_B$ to a signed ciphertext word signal $C_{Bs}$, and for transmitting $C_{Bs}$ on said channel in place of $M_{Bs}$, whereby $C_{Bs}$ corresponds to a number representative of a signed enciphered form of said message and corresponds to:

$$C_{Bs} \equiv M_{Bs}''{}^{e_A} \pmod{n_A}$$

where $M_{Bs}$ corresponds to a number representative of a block of said signed message word signal $M_{Bs}$ in the range $0 \leq M_{Bs} \leq n_A - 1$, wherein said decoding means of said first terminal is adapted to first transform said signed enciphered form of said message $C_{As}$ to $M_{Bs}''$ in accordance with:

$$M_{Bs}'' \equiv C_{Bs}{}^{d_A} \pmod{n_A}$$

then to transform $M_{Bs}''$ to $M_{Bs}$, and then to transform $M_{Bs}$ to said receive message word signal $M_B'$, and corresponds to $$M_B' \equiv M_{Bs}{}^{e_B} \pmod{n_B}.$$

18. A cryptographic communications system having a plurality of terminals coupled by a communications channel, including a first terminal characterized by an associated encoding key $E_A=(e_A, n_A)$ and decoding key $D_A=(d_A, n_A)$, and including a second terminal wherein $n_A$ is a composite number of the form $$n_A = p_A \cdot q_A$$

$p_A$ and $q_A$ are prime numbers, $e_A$ is relatively prime to $1 \; cm(p_A-1, q_A-1)$, $d_A$ is a multiplicative inverse of $$e_A(\mod 1 \; cm((p_A-1),(q_A-1))),$$

wherein said second terminal comprises:

blocking means for transforming a message-to-be-transmitted from said second terminal to said first terminal, to one or more transmit message word signals $M_B$, where $M_B$ corresponds to a number representative of said message in the range $$0 \leq M_B \leq n_A - 1$$

encoding means coupled to said channel and adapted for transforming each transmit message word signal $M_B$ to a ciphertext word signal $C_B$ and for transmitting $C_B$ on said channel, where $C_B$ corresponds to a number representative of an enciphered form of said message and corresponds to $$C_B \equiv M_B{}^{e_A} \pmod{n_A}$$

wherein said first terminal comprises:

decoding means coupled to said channel and adapted for receiving said ciphertext word signals $C_B$ from said channel and for transforming each of said ciphertext word signals to a receive message word signal $M_B$, and means for transforming said receive message word signals $M_B'$ to said message, where $M_B'$ is a number representative of a deciphered form of $C_B$ and corresponds to $$M_B' \equiv C_B^{d_A} (\text{mod } n_A).$$

19. A system according to claim 18 wherein at least one of said transforming means comprises:
   a first register means for receiving and storing a first digital signal representative of said signal-to-be-transformed,
   a second register means for receiving and storing a second digital signal representative of the exponent of the equivalence relation defining said transformation,
   a third register means for receiving and storing a third digital signal representative of the modulus of the equivalency relation defining said transformation, and
   an exponentiation by repeated squaring and multiplication network coupled to said first, second and third register means, said network including:
   A. an output register means for receiving and storing a first multiplier signal and for applying said first multiplier signal to a first multiplier input line,
   B. selector means for successively selecting each of the bits of said second digital signal as a multiplier selector signal,
   C. means operative for each of said multiplier selector signals for selecting as a second multiplier signal either the contents of said output register means or the contents of said first register means, and for said second applying multiplier signal to a second multiplier input line, said selection being dependent on the binary value of the successive bits of said second digital signal, and
   (D. modulo multiplier means operative in step with said selector means and responsive to said first and second multiplier signals on said first and second multiplier input lines for successively generating first multiplier signals for transferring said first multiplier signals to said output register means, said first multiplier signal initially being representative of binary 1, and thereafter being representative of the modulo product of said first and second multiplier signals, where the modulus of said modulo product corresponds to said third digital signal.

20. The system according to claim 18 wherein said second terminal is characterized by an associated encoding key $E_B = (e_B, n_B)$ and decoding key $D_B = (d_B, n_B)$, where:
   $n_B$ is a composite number of the form $$n_B = p_B \cdot q_B$$

$p_B$ and $q_B$ are prime numbers,
   $e_B$ is relatively prime to 1 cm($p_B - 1, q_B - 1$),
   $d_B$ is a multiplicative inverse of $$e_B(\text{mod}(1 \text{ cm}((p_B-1),(q_B-1)))).$$

wherein said first terminal comprises:
   blocking means for transforming a message-to-be-transmitted from said first terminal to said second terminal, to one or more transmit message word signals $M_A$,
   where $M_A$ corresponds to a number representative of said message in the range $$0 \leq M_A \leq n_B - 1$$

encoding means coupled to said channel and adapted for transforming each transmit message word signal $M_A$ to a ciphertext word signal $C_A$ and for transmitting $C_A$ on said channel,
   where $C_A$ corresponds to a number representative of an enciphered form of said message and corresponds to $$C_A \equiv M_A^{e_B}(\text{mod } n_B)$$

wherein said second terminal comprises:
   decoding means coupled to said channel and adapted for receiving said ciphertext word signals $C_A$ from said channel and for transforming each of said ciphertext word signals to a receive message word signal $M_A'$, and
   means for transforming said receive message word signals $M_A$ to said message,
   where $M'$ corresponds to a number representative of a deciphered form of C and corresponds to $$M_A' \equiv C_A^{d_B}(\text{mod } n_B).$$

21. The system according to claim 18 wherein said second terminal is characterized by an associated encoding key $E_B = (e_B, n_B)$ and decoding key $D_B = (d_B, n_B)$, where:
   $n_B$ is a composite number of the form $$n_B = p_B \cdot q_B$$

$p_B$ and $q_B$ are prime numbers,
   $e_B$ is relatively prime to 1 cm($p_B - 1, q_B - 1$),
   $d_B$ is a multiplicative inverse of $$e_B(\text{mod}(1 \text{ cm}((p-1),(q-1)))),$$

wherein said encoding means of said second terminal is adapted for transforming said message word signal $M_B$ to a signed cipher-text word signal $C_{Bs}$, and for transmitting $C_{Bs}$ on said channel in place of $C_B$, whereby $C_{Bs}$ corresponds to a number representative of a signed enciphered form of said message and corresponds to:

$$C_{Bs} \equiv C_B''^{d_B}(\text{mod } n_B)$$

where $C_B''$ corresponds to a number representative of a block of said ciphertext word signal $C_B$ in the range $0 \leq C_B'' \leq n_B - 1$,
wherein said decoding means of said first terminal is adapted to first transform said signed enciphered form of said message $C_{Bs}$ to $C_B''$ in accordance with:

$$C_B'' \equiv C_{Bs}^{e_B}(\text{mod } n_B)$$

then to transform $C_B''$ to $C_B$, and then to transform $C_B$ to said receive message word signal $M_B'$, where $M_B'$ corresponds to a number representative of a deciphered form of $C_{Bs}$ and corresponds to:

$$M_B' \equiv C_B^{d_A}(\text{mod } n_A).$$

22. The system according to claim 20 wherein said encoding means of said second terminal is adapted for transforming said message word signal $M_B$ to a signed ciphertext word signal $C_{Bs}$, and for transmitting $C_{Bs}$ on said channel in place of $C_B$, whereby $C_{Bs}$ corresponds to a number representative of a signed enciphered form of said message and corresponds to:

$$C_{Bs} \equiv C_B''^{d_B} \pmod{n_B}$$

where $C_B''$ corresponds to a number representative of a block of said ciphertext word signal $C_B$ in the range $0 \leq C_B'' \leq n_B - 1$,
wherein said decoding means of said first terminal is adapted to first transform said signed enciphered form of said message $C_{Bs}$ to $C_B''$ in accordance with:

$$C_B'' \equiv C_{Bs}^{e_B} \pmod{n_B}$$

and then to transform $C_B$ to $C_B$, and then to transform $C_B$ to said receive message word signal $M_B'$, where $M_B'$ is a number representative of a deciphered form of $C_B$ and corresponds to:

$$M_B' \equiv C_B^{d_A} \pmod{n_A}$$

wherein further said encoding means of said first terminal is adapted to transform said message word signal $M_A$ to a signal ciphertext word signal $C_{As}$, as for transmitting $C_{As}$ on said channel in place of $C_B$, whereby $C_A$ corresponds to a number representative of a signed enciphered form of said message and corresponds to:

$$C_A \equiv C_A''^{d_A} \pmod{n_A}$$

where $C_A''$ corresponds to a number representative of a block of said ciphertext word signal $C_A$ in the range of $0 \leq C_A'' \leq n_A - 1$,
wherein said decoding means of said second terminal is adapted to first transform said signaled enciphered form of said message $C_{As}$ to $C_A''$ in accordance with:

$$C_A'' \equiv C_{As}^{e_A} \pmod{n_A},$$

then to transform $C_A''$ to $C_A$, and then to transform $C_A$ to said receive message word signal $M_A'$, where $M_A'$ corresponds to a number representative of a deciphered form of $C_A$ and corresponds to:

$$M_A \equiv C_A^{d_B} \pmod{n_B}$$

23. A method for establishing cryptographic communications comprising the step of:
encoding a digital message word signal M to a ciphertext word signal C, where M corresponds to a number representative of a message and $$0 \leq M \leq n - 1$$

where n is a composite number of the form $$n = p \cdot q$$

where p and q are prime numbers, and
where C is a number representative of an encoded form of message word M,
wherein said encoding step comprises the step of:
transforming said message word signal M to said ciphertext word signal C whereby $$C \equiv M^e \pmod{n}$$

where e is a number relatively prime to $(p-1) \cdot (q-1)$.

24. The method according to claim 23 comprising the further step of:
decoding said ciphertext word signal C to said message word signal M,
wherein said decoding step comprises the step of:
transforming said ciphertext word signal C, whereby:

$$M \equiv C^d \pmod{n}$$

where d is a multiplicative inverse of $e \pmod{1 \text{ cm}((p-1), (q-1))}$.

25. A method for transferring a message signal $M_i$ in a communications system having k terminals, wherein each terminal is characterized by an encoding key $E_i = (e_i, n_i)$ and decoding key $D_i = (e_i, n_i)$, where $i = 1, 2, \ldots, k$, and wherein
$M_i$ corresponds to a number representative of message-to-be-transmitted from the $i^{th}$ terminal, and $$0 \leq M_i \leq n_i - 1,$$

$n_i$ is a composite number of the form $$n_i = p_i \cdot q_i$$

$p_i$ and $q_i$ are prime numbers,
$e_i$ is relatively prime to $1 \text{ cm}(p_i - 1, q_i - 1)$,
$d_i$ is a multiplicative inverse of $$e_i \pmod{1 \text{ cm}((p_i - 1),(q_i - 1))}$$

comprising the step of:
encoding a digital message word signal $M_A$ for transmission from a first terminal ($i = A$) to a second terminal ($i = B$), said encoding step including the sub-step of:
transforming said message word signal $M_A$ to a signed message word signal $M_{As}$, $M_A$ corresponding to a number representative of an encoded form of said message word signal $M_A$, whereby:

$$M_{As} \equiv M_A^{d_A} \pmod{n_A}.$$

26. The method of claim 25 comprising the further steps of:
transmitting said signed message word signal $M_{As}$ to said second terminal, and
decoding said signed message word signal $M_{As}$ to said message word signal $M_A$, said decoding step including the sub-step of:
transforming said ciphertext word signal $C_A$ to said message word signal $M_A$, whereby $$M_A \equiv M_{As}^{e_A} \pmod{n_A}.$$

27. The method of claim 25 wherein said encoding step comprises the further steps of:
transforming said signed message word signal $M_{As}$, one or more signed message block word signals $M_{As}$,
each block word signal $M_{As}''$ corresponding to a number representative of a portion of said signed message word signal $M_A$ in the range $0 \leq M_{As}'' \leq n_B - 1$, and
transforming each of said signed message block word signals $M_{As}$ to a signed ciphertext word signal $C_{As}$, $C_{As}$ corresponding to a number representative of an encoded form of said signed message block word signal, whereby $$C_{As} \equiv M_{As}^{e_B} \pmod{n_B}.$$

28. The method of claim 26 comprising the further steps of:
   transmitting said signed ciphertext word signal $C_{As}$ to said second terminal,
   decoding said signed ciphertext words to said message word signal $M_A$, said decoding step including the sub-steps of:
      transforming each of said signed ciphertext word signals $C_{As}$ to one of said signed message block word signals $M_{As}''$, whereby $$M_{As}'' \equiv C_{As}^{dB} (\text{mod } n_B)$$

transforming said signed message block word signals to said signed message word signal $M_{As}$,
   transforming said signed message word signal to said message word signal $M_A$, whereby $$M_A \equiv M_{As}^{eA} (\text{mod } n_A).$$

29. A method for transferring a message signal $M_i$ in a communications system having k terminals, wherein each terminal is characterized by an encoding key $E_i = (e_i, n_i)$ and decoding key $D_i = (e_i, n_i)$, where $i = 1, 2, \ldots, k$, and wherein
   $M_i$ corresponds to a number representative of a message-to-be-transmitted from the $i^{th}$ terminal,
   $n_i$ is a composite number of the form $$n_i = p_i q_i$$

$p_i$ and $q_i$ are prime numbers,
   $e_i$ is relatively prime to $\text{lcm}(p_i - 1, q_i - 1)$,
   $d_i$ is a multiplicative inverse of $$e_i (\text{mod}(\text{lcm}((p_i - 1), (q_i - 1))))$$

comprising the step of:
   encoding a digital message word signal $M_A$ for transmission from a first terminal (i = A) to a second terminal (i = B), said encoding step including the sub-step of:
      transforming said message word signal $M_A$ to one or more message block word signals $M_A''$, each block word signal $M_A''$ corresponding to a number representative of a portion of said message word signal $M_A$ in the range $0 \leq M_A'' \leq n_B - 1$,
      transforming each of said message block word signals $M_A''$ to a ciphertext word signal $C_A$, $C_A$ corresponding to a number representative of an encoded form of said message block word signal $M_A''$, whereby:

$$C_A \equiv M_A''^{eB} (\text{mod } n_B).$$

30. The method of claim 29 comprising the further steps of:
   transmitting said ciphertext word signals to said second terminal, and
   decoding said ciphertext word signals to said message word signal $M_A$, said decoding step including the sub-steps of:
      transforming each of said ciphertext word signals $C_A$ to one or said message block word signals $M_A''$, whereby $$M_A'' \equiv C_A^{dB} (\text{mod } n_B)$$

transforming said message block word signals $M_A''$ to said message word signal $M_A$.

31. The method of claim 29 wherein said encoding step comprises the further step of:
   transforming said ciphertext word signal $C_A$ to one or more ciphertext block word signals $C_A$, each block word signal $C_A''$ corresponding to a number representative of a portion of said ciphertext word signal $C_A$ in the range $0 \leq C_A'' \leq n_A - 1$,
   transforming each of said ciphertext block word signals $C_A''$ to a signed ciphertext word signal $C_{As}$, $C_{As}$ corresponding to a number representative of an encoded form of said ciphertext block word signal $C_A''$, whereby $$C_{As} \equiv C_A''^{dA} (\text{mod } n_A).$$

32. The method of claim 31 comprising the further steps of:
   transmitting said signed ciphertext word signals to said second terminal,
   decoding said signed ciphertext word signals to said message word signal $M_A$, said decoding step including the sub-steps of:
      transforming each of said signed ciphertext word signals $C_{As}$ to one of said ciphertext block word signals $C_A''$, whereby $$C_A'' \equiv C_{As}^{eA} (\text{mod } n_A)$$

transforming said ciphertext block word signals to said message block word signals, whereby $$M_A'' \equiv C_A''^{dB} (\text{mod } n_B)$$

transforming said message block word signals to said message word signal $M_A$.

33. In a communications system,
   an encoding means for transforming a transmit message word signal M to a ciphertext word signal C
   where M corresponds to a number representative of a message and $$0 \leq M \leq n - 1$$

where n is a composite number, and
   where C corresponds to a number representative of an enciphered form of said message and corresponds to $$C \equiv a_e M^e + a_{e-1} M^{e-1} + \ldots + a_0 (\text{mod } n)$$

where e and $a_e, a_{e-1}, \ldots a_0$ are numbers.

34. A system according to claim 28 wherein at least one of said transforming means comprises:
   a first register means for receiving and storing a first digital signal representative of said signal-to-be-transformed,
   a second register means for receiving and storing a second digital signal representative of the exponent of the equivalence relation defining said transformation,
   a third register means for receiving and storing a third digital signal representative of the modulus of the equivalency relation defining said transformation, and
   an exponentiation by repeated squaring and multiplication network coupled to said first, second and third register means, said network including:
      A. an output register means for receiving and storing a first multiplier signal and for applying said first multiplier signal to a first multiplier input line, B. selector means for successively selecting each of the bits of said second digital signal as a multiplier selector signal, C. means operative for each of said multiplier selector signals for selecting as a second multiplier signal either the contents of said output register means or the contents of said first register means, and for said second applying multiplier signal to a second multiplier input line, said selection being dependent on the binary value of the successive bits of said second digital signal, and D. modulo multiplier means operative in step with said selector means and responsive to said first and second multiplier signals on said first and second multiplier input lines for successively generating first multiplier signals and for transferring said first multiplier signals to said output register means, said first multiplier signal initially being representative of binary 1, and thereafter being representative of the modulo product of said first and second multiplier signals, where the modulus of said modulo product corresponds to said third digital signal.

35. In the communications system according to claim 33 where e is relatively prime to the Euler totient function of n, $\emptyset(n)$, and where $a_e = 1$ and $a_{e-1}, \ldots, a_0$ equal zero, a decoding means adapted for receiving C and for transforming C to a receive message word signal M', where M' corresponds to a number representative of a deciphered form of C and corresponds to $$M' \equiv C^d (\text{mod } n)$$

where d is a multiplicative inverse of $e(\text{mod}(\lambda(n)))$ where $\lambda(n)$ is the least positive integer such that $$S^{\lambda(n)} \equiv 1(\text{mod } n)$$

for all integers S relatively prime to n.

36. In the communications system according to claim 33 where said encoding means is adapted to transform M to C by the performance of a first ordered succession of invertible operations on M, at least one of said operations being exponentiation, a decoding means adapted to transform C to M by the performance of a second ordered succession of invertible operations on C, wherein each of the invertible operations of said second succession is the inverse of a corresponding one of said first succession, and wherein the order of said operations in said second succession is reversed with respect to the order of corresponding operations in said first succession.

37. A method for establishing cryptographic communications comprising the step of:

encoding a digital message word signal M to a ciphertext word signal C, where M corresponds to a number representative of a message and $$0 \leq M \leq n - 1$$

where n is a composite number and
where C corresponds to a number representative of an encoded form of message word M,
wherein said encoding step comprises the step of:
transforming said message word signal M to said ciphertext word signal C whereby $$C \equiv a_e M^e + a_{e-1} M^{e-1} + \ldots + a_0 (\text{mod } n)$$

where e and $a_e, a_{e-1}, \ldots a_0$ are numbers.

38. In the method according to claim 37 where e is relatively prime to the Euler totient function of n, $\emptyset n$), and where $a_e = 1$ and $a_{e-1}, \ldots, a_0$ equal zero, the further step of:

decoding said ciphertext word signal C to said message word signal M,
wherein said decoding step comprises the step of:
transforming said ciphertext word signal C, whereby:

$$M \equiv C^d (\text{mod } n)$$

where d is a multiplicative inverse of $e(\text{mod}(\lambda(n))$ where $\lambda(n)$ is the least positive integer such that $$S^{\lambda(n)} \equiv 1(\text{mod } n)$$

for all integers S relatively prime to n.

39. In the method according to claim 37 where said encoding step includes the step of transforming M to C by the performance of a first ordered succession of invertible operations on M, the further step of:

decoding C to M by the performance of a second ordered succession of invertible operations on C, where each of the invertible operations of said second succession is the inverse of a corresponding one of said first succession, and wherein the order of said operations in said second succession is reversed with respect to the order of corresponding operations in said first succession.

40. A method according to claims 23 or 24 or 25 or 26 or 27 or 28 or 29 or 30 or 31 or 32 or 37 or 38 or 39 wherein at least one of said transforming means comprises the steps of:

receiving and storing a first digital signal in a first register, said first digital signal being representative of said word-to-be-transformed, receiving and storing a second digital signal in a second register, said second digital signal being representative of the exponent of the equivalence relation defining said transformation, receiving and storing a third digital signal in a third register, said third digital signal being representative of the modulus of the equivalency relation defining said transformation, and exponentiating said first digital signal by repeated squaring and multiplication using said second and third digital signals, said exponentiating step including the substeps of:

A. receiving and storing a first multiplier signal in an output register, and applying said first multiplier signal to a first multiplier input line, B. successively selecting each of the bits of said second digital signal as a multiplier selector, and C. for each of said multiplier selectors, selecting as a second multiplier signal either the contents of said output register or the contents of said first register, and for applying said second multiplier signal to a second multiplier output line, said selection being dependent on the binary value of the successive bits of said second digital signal, D. for each of said multiplier selectors, generating said first multiplier signal in a modulo multiplier in response to the first and second multiplier signals on said first and second multiplier input lines, and for transferring said generated first multiplier signal to said output register, said first multiplier signal initially being representative of binary 1 and thereafter being representative of the modulo product of said first and second multipliers, where the modulus of said modulo product corresponds to said third digital signal.

* * * * *